United States Patent [19]
Duckworth

[11] 3,723,845
[45] Mar. 27, 1973

[54] TRUE RMS TO DC CONVERTERS
[75] Inventor: James J. Duckworth, Morris Plains, N.J.
[73] Assignee: Ballantine Laboratories, Inc., Boonton, N.J.
[22] Filed: July 16, 1971
[21] Appl. No.: 163,231

[52] U.S. Cl. ................. 321/1.5, 307/261, 321/18, 324/106, 321/47
[51] Int. Cl. ............................................. H02m 7/00
[58] Field of Search ......... 307/260, 261; 321/1.5, 18; 324/106

[56] References Cited
UNITED STATES PATENTS

| | | | |
|---|---|---|---|
| 3,521,164 | 7/1970 | Richman | 324/106 |
| 3,210,663 | 10/1965 | Moseley et al. | 324/106 X |
| 3,273,059 | 9/1966 | Andresen et al. | 324/106 |
| 3,435,319 | 3/1969 | Richman | 324/106 X |
| 3,470,445 | 9/1969 | Richman | 321/1.5 |
| 3,518,525 | 6/1970 | Duckworth et al. | 321/1.5 |

Primary Examiner—William M. Shoop, Jr.
Attorney—Daniel H. Steidl, John B. Pegram and Davis, Hoxie, Faithfull & Hapgood

[57] ABSTRACT

An apparatus for converting a complex AC voltage wave to an equivalent DC value which is a measure of its true RMS value and which may then be read on an accurate indicating device such as a digital voltmeter, incorporating thermal converters and operational amplifiers in a temperature-compensated configuration. The apparatus maintains a portion of an unknown AC voltage wave, which is thermally converted into a DC voltage, substantially equal to a DC reference voltage. A portion of a DC output voltage is also maintained substantially equal to the DC reference voltage. Since the proportioning means for the complex AC voltage wave and the DC output voltage is the same, the true R.M.S. value of the complex AC voltage wave is equal to the DC output voltage.

20 Claims, 2 Drawing Figures

Patented March 27, 1973

3,723,845

INVENTOR.
James J. Duckworth
BY
Marshall J. Breen
ATTORNEY

TRUE RMS TO DC CONVERTERS

BACKGROUND OF THE INVENTION

This invention relates to devices for converting the root mean square (R.M.S.) value of a complex AC voltage wave to a DC value, and more particularly to an apparatus for thermally converting the true R.M.S. value of a complex AC voltage wave to an equivalent DC voltage.

A thermal converter is defined as a device which comprises a resistance heating element, hereinafter referred to as the input, coupled in close proximity to a thermocouple, hereinafter referred to as the output.

The heat generated by a resistance element heats a thermocouple which generates a voltage. The heat produced by the resistance element is equal to the input current squared times the resistance of the element. The voltage produced by the thermocouple is proportional to its temperature and, thereby, to the amount of heat produced by the resistance element. Therefore, by definition, the DC voltage produced by the thermocouple is proportional to the mean square (R.M.S.)$^2$ value of the input current.

Various prior-art device used for root mean square conversion and measurement utilize diode shaping circuits which are limited in their frequency response characteristics and accuracy. Improved devices which are thermal converters improve the frequency response characteristics and accuracy, but suffer from the effects of ambient temperature variations upon the individual thermocouple elements. Where matched thermocouples mounted in close proximity are utilized in a bucking arrangement to cancel the effects of temperature variations, a known AC reference source is generally used for comparison purposes.

SUMMARY OF THE INVENTION

A preferred embodiment of the present invention utilizes thermal converters connected in a bucking arrangement to eliminate the effects of ambient temperature change and a DC reference source to provide increased accuracy, stability and linearity, with a minimum of components and cost.

In accordance with the principles of the present invention, an apparatus for converting a complex AC voltage wave to its true root mean square value comprises a DC reference voltage, first means for coupling an AC voltage proportional to the complex AC voltage wave to a comparison point, means for varying the first coupling means to maintain the effective heating value of the AC voltage equal to the effective heating value of the DC reference voltage, a DC output voltage, and second means for coupling a portion of the DC output voltage to the comparison point, the second coupling means providing a DC voltage at the comparison point substantially equal to the DC reference voltage, whereby the DC output voltage is substantially equal to the root mean square value of said complex AC voltage wave.

DESCRIPTION OF THE PREFERRED EMBODIMENTS

Figure 1:
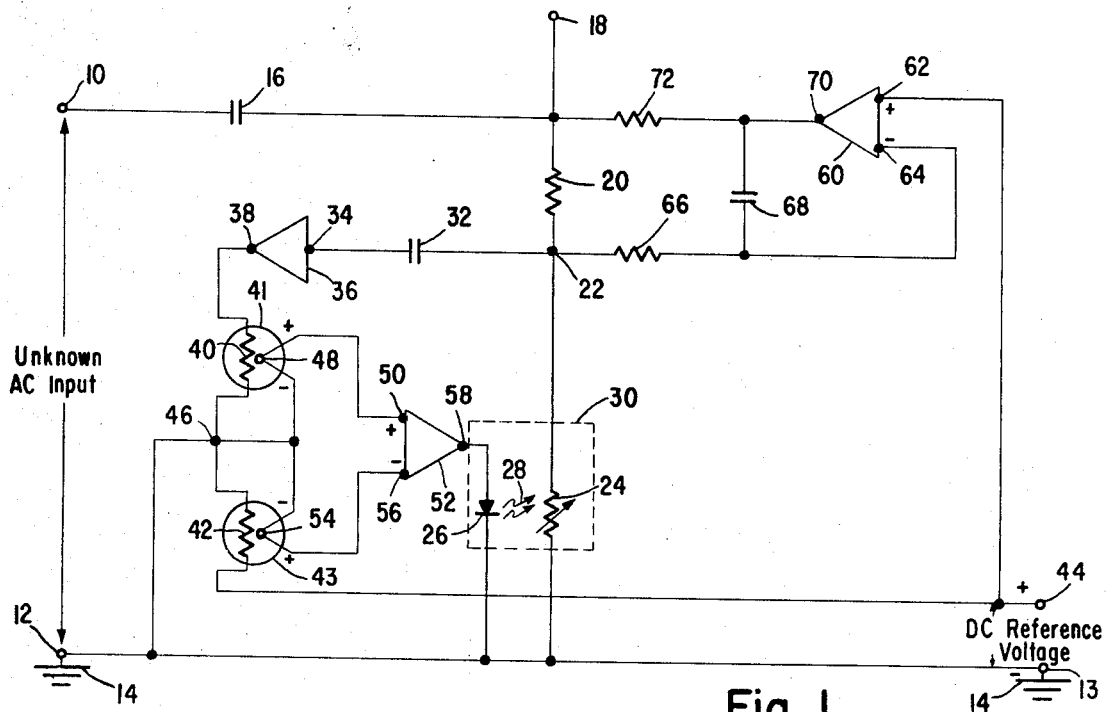
FIG. 1 is a simplified block diagram of a first embodiment of the present invention.

Referring to FIG. 1, an unknown complex AC voltage wave is coupled to input terminals 10 and 12. Terminals 12 and 13 are common to both input and output circuits and are connected to a reference ground 14. The unknown complex AC voltage wave is coupled through capacitor 16, which functions as a DC blocking capacitor, to output terminal 18. Capacitor 16 has a relatively low impedance at the AC frequencies to be measured and also prevents the DC voltage appearing at output terminal 18 from being coupled back to the source of the unknown AC voltage wave under measurement.

The unknown AC voltage wave is coupled by a resistor 20 to a comparison point 22. A second resistance element 24 is coupled from the comparison point 22 to the reference ground terminals 12 & 13 Resistors 20 and 24 form a voltage divider network thereby causing the AC voltage appearing at comparison point 22 to be less than the unknown AC voltage wave coupled to the input terminals 10 and 12.

Resistance element 24, in the preferred embodiment of the invention is a photoresistor with a resistance value dependent upon the amount of light received. The photoresistor 24 is physically coupled in close proximity to a light emitting device 26 in order that the light rays 28 from the light emitting device may readily fall on the photoresistor 24.

In the preferred embodiment of the invention, the light emitting device 26 is a light emitting diode (LED) which is physically mounted with the photoresistor 24 in a common housing 30. Increasing the light output of the LED 26 will decrease the resistance of photoresistor 24 and, conversely, decreasing the light output of the LED 26 will increase the resistance of the photoresistor 24.

The AC voltage appearing at comparison point 22 is coupled by capacitor 32, which functions as a DC blocking capacitor and has a relatively low impedance at the frequencies to be measured, to the input terminal 34 of AC operational amplifier 36. The AC operational amplifier is of conventional design and has a relatively high input impedance, when compared to the impedances of resistors 20 and 24, and a relatively low output impedance. In the preferred embodiment the AC operational amplifier is operated with unity gain.

The output terminal 38 of AC operational amplifier 36 is coupled to the input of thermal converter 41 which is a conventional heater wire 40. Heater wire 40 is connected in series with the input heater wire 42 of thermal converter 43 to terminal 44, which is adapted to have a DC reference voltage connected thereto. The common junction point 46 of thermal converter inputs 40 and 42 is connected to the ground reference terminal 12.

Output thermocouples 48 and 54 of thermal converters 41 and 43 respectively are connected ed in series opposition. This insures that variations in output voltage caused by ambient temperature changes are cancelled out by equal changes in the other thermocouple.

One end of output thermocouple 48 is coupled to an input terminal 50 of a high gain DC differential operational amplifier 52 which has a relatively high input impedance and a relatively low output impedance. One end of thermocouple 54 is connected to the other input terminal 56 of amplifier 52. The junction 46 of thermocouples 48 and 54 is connected to the reference ground terminal 12. LED 26 is connected from the output terminal 58 of operational amplifier 52 to ground terminal 12.

A second high gain DC operational amplifier 60 having characteristics similar to amplifier 52 has one of its input terminals 62 coupled to terminal 44 which is connected to the DC reference voltage mentioned earlier. The second input terminal 64 of DC operational amplifier 60 is coupled through a relatively large resistance 66 to the comparison point 22. A capacitor 68 coupled from the second input terminal 64 to the output terminal 70 of amplifier 60 functions to filter the AC voltage so that substantially a DC voltage appears at input terminal 64. The output terminal 70 is coupled through resistor 72 to terminal 18 which makes available a DC voltage substantially equal to the effective root mean square (R.M.S.) value of the unknown complex AC voltage wave under measurement.

In operation, the unknown complex AC voltage is connected across terminals 10 and 12. A portion of this unknown AC voltage will appear between the comparison point 22 and ground terminal 12. This portion of the unknown AC voltage is coupled in a first current path including resistor 20, which is a common impedance being in both the AC and DC paths, AC operational amplifier 36, capacitor 32 and thermal converter 41. Amplifier 36 provides a current which flows through the input heater wire 40 of thermal converter 41, thereby generating heat and causing the temperature of rise. The first current path further includes amplifier 52, LED 26 and resistor 24.

Thermocouple 48 senses the temperature and generates a voltage dependent upon the temperature reached. The DC reference voltage causes a current to flow through input heater wire 42 causing the temperature to rise in thermal converter 43. Thermocouple 54 will also generate a voltage dependent upon the temperature reached.

Thermal converters 41 and 43 are selected to be matched; that is to say, for equal currents applied to the heater wires 40 and 42, equal voltages will appear across each output thermocouple, 48 and 54. The output thermocouples 48 and 54 are connected in series opposing or bucking relationship so that the voltage appearing between terminals 50 and 56 of amplifier 52 will be zero when the same effective current is fed to both heater wires 40 and 42.

If the currents into the heater wires 40 and 42 are unequal then a voltage equal to the difference in the thermocouple output voltages will appear across terminals 50 and 56. This will cause the output terminal 58 of amplifier 52 to supply a current to LED 26 which either increases or decreases its light output. This in turn will vary the impedance of photoresistor 24 so that the attenuation of the voltage divider, comprised of resistors 20 and 24, will vary and change the voltage appearing at the reference point 22 so that the AC voltage at the reference point will become that value which will cause both thermocouples 48 and 54 to have equal voltages across them. Thus, the effective value of the AC voltage at the comparison point 22 is made to substantially equal the DC reference voltage.

The voltage at the reference point 22 is coupled in a second current path, the second current path being a DC current path, including resistor 66 to input terminal 64 of differential amplifier 60 where it is compared to the DC reference voltage appearing at terminal 62. The second current path further includes amplifier 60, resistor 72, and resistor 20 which is the common impedance since it also appears in the first current path. If the voltage at terminal 64 is not substantially equal to the reference voltage, which is coupled to terminal 62, then the DC voltage at the amplifier output terminal 70 will vary and assume a value such that the voltage at terminals 62 and 64 are substantially equal. Amplifier 60 is connected in an inverting mode within the variable voltage connected to terminal 64. This mode provides the negative feedback necessary to close the loop. Thus, the DC voltage at the comparison point 22 is made to substantially equal the reference voltage.

If the DC voltage at the comparison point 22 is equal to the DC reference voltage and the effective value of the unknown complex AC voltage appearing at the comparison point 22 is equal to the DC reference voltage then they are equal to each other.

The voltage divider used for obtaining the voltage at the comparison point 22 consists of resistors 20 and 24 connected in series between terminals 18 and 12. Since these same divider resistors are used to obtain both the AC and DC voltages at the comparison point 22 then the effective value of the unknown AC voltage between terminals 18 and 12 must be equal to the DC voltage appearing between terminals 18 and 12. An accurate DC indicating device such as a digital voltmeter connected between terminals 18 and 12 will therefore, indicate the effective value of an unknown complex AC voltage wave coupled between input terminals 10 and 12. The DC digital voltmeter will not respond to any rapid changes of AC appearing at terminal 18 because of its normal internal dynamic filtering.

It is to be noted that the DC operational amplifiers 52 and 60 may be the type including chopper stabilization.

Figure 2:
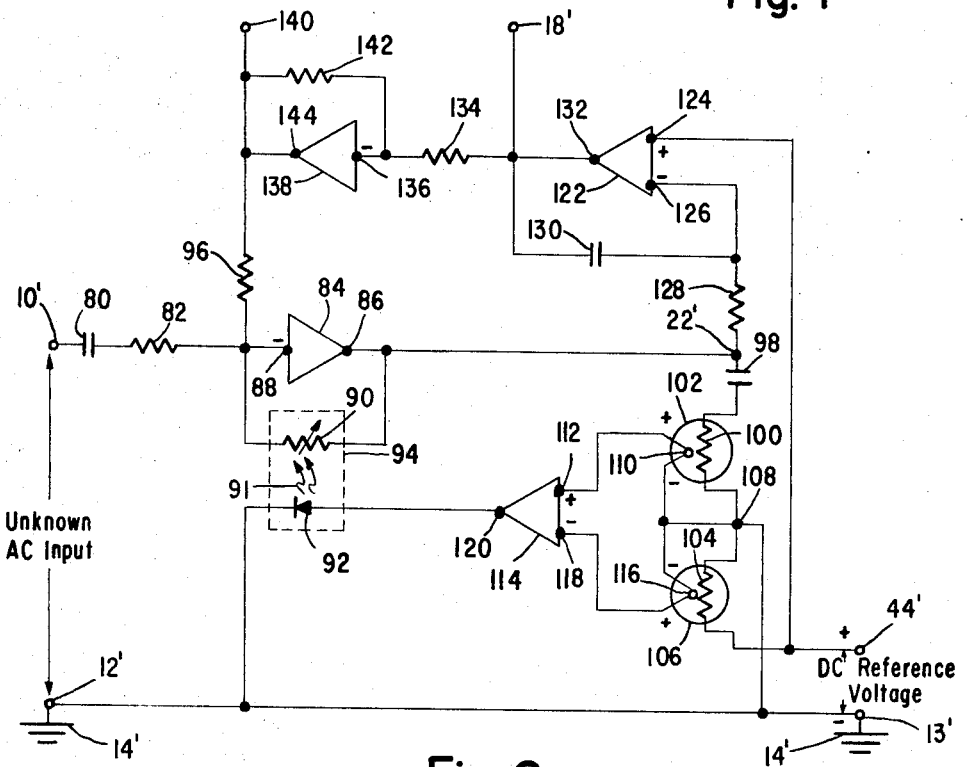
FIG. 2 is a simplified block diagram of a second embodiment of a true AC to DC converter embodying the principles of the present invention.

FIG. 2 shows a second embodiment of a true AC to DC converter embodying the principles of the present invention. The embodiment of FIG. 2 utilizes a high gain operational amplifier to control the AC and the DC voltage appearing at the comparison point 22 instead of the voltage divider (20 and 24) shown in FIG. 1. An unknown complex AC voltage wave is coupled to input terminals 10' and 12'. Terminals 12' and 13' are common to both input and output circuits and are connected to a reference ground 14'.

The unknown complex AC voltage is coupled through capacitor 80, which functions as a DC blocking capacitor and has a relatively low impedance at the frequencies to be measured, resistor 82, and a high-gain wide-band operational amplifier; which can operate down to DC, to the comparison point 22'. The output terminal 86 of the wide-band operational amplifier 84 is connected to its input terminal 88 by means of a resistance element 90.

Resistance element 90 is a photoresistor, similar to the photoresistor 24 of FIG. 1, and is coupled in close proximity to LED 92, and in the present embodiment is mounted within the same housing 94 as photoresistor 90. The resistance value of photoresistor 90 depends on the amount of light 91 received from LED 92 and therefore controls the gain of amplifier 84 since the AC gain of amplifier 84 is determined by the resistance value of resistor 90 divided by the value of resistor 82, and the DC gain of amplifier 84 is determined by the resistance value of resistor 90 divided by the resistance value of resistor 96.

The AC voltage appearing at comparison point 22' is coupled by capacitor 98, which functions as a DC blocking capacitor and has a relatively low impedance at the frequencies to be measured to the input heater wire 100 of thermal converter 102. The input heater wire 100 is connected in series with heater wire 104 of thermal converter 106, to terminal 44', which is adapted to have a DC reference voltage connected thereto. The common junction point 108 of thermal converter inputs 100 and 104 is connected to the ground reference terminal 12'.

Output thermocouples 110 and 116 of thermal converters 102 and 106 respectively are connected in series opposition. This insures that variations in output voltage of one thermocouple caused by ambient temperature changes are cancelled out by equal changes in the other thermocouple.

One end of output thermocouple 110 is coupled to an input terminal 112 of a high gain DC differential operational amplifier 114 which has a relatively high input impedance and a relatively low output impedance and may be chopper stabilized. One end of thermocouple 116 is connected to the other input terminal 118 of amplifier 114. The junction 108 of thermocouples 110 and 116 is connected to the reference ground terminal 12'. LED 92 is connected from the output terminal 120 of amplifier 114 to ground terminal 12'.

Amplifier 84 with resistor 90 attached thereto is referred to as a common impedance since it is common to both the AC and DC current paths.

A second high gain DC differential operational amplifier 122, having characteristics similar to amplifier 114, has one of its input terminals 124, coupled to terminal 44' which is connected to the DC reference voltage mentioned earlier. The second input terminal 126 of DC differential amplifier 122 is coupled through a relatively large resistance 128 to the comparison point 22'. A capacitor 130, coupled from the second input terminal 126 to the output terminal 132 of amplifier 122, functions to filter the AC voltage so that a substantially DC voltage appears at the second input terminal 126. The output terminal 132 is coupled through resistor 134 to input terminal 136 of a DC operational amplifier 138 and to terminal 18', which makes available a DC voltage substantially equal to the effective or root mean square (R.M.S.) value of the unknown AC voltage wave under measurement.

Resistor 142 is connected from the input terminal 136 of amplifier 138 to the output terminal 144 of the same amplifier. Output terminal 144 is coupled through resistor 96 to the input terminal 88 of amplifier 84. Resistor 134 is selected to be equal to resistor 142, in the preferred embodiment of the invention, so that amplifier 138 operates as an inverting amplifier with unity gain. A DC voltage is available therefore, at terminal 140 which is connected to terminal 144, which is of the same magnitude but of opposite polarity to the DC voltage appearing at terminal 18'.

In operation, the unknown AC voltage wave to be measured is coupled across terminals 10' and 12'. The AC voltage is coupled in a first current path including capacitor 80, resistor 82, and amplifier 84 to comparison point 22'. The first current path additionally includes capacitor 98, thermal converter 102, amplifier 114, LED 92, and resistor 90. Amplifier 84 amplifies the voltage appearing at the input terminal 88 and couples it to comparison point 22' where it is coupled through capacitor 98 to the input heater wire 100 of thermal converter 102. A comparison is made between the heat generated by the AC voltage at point 22' and the heat generated by the reference voltage connected to terminal 44' and coupled to heater wire 104 of thermal converter 106. The functioning of this arrangement is the same as that described earlier in conjunction with thermal converters 41 and 43 of FIG. 1.

The current available at output terminal 120 of amplifier 114 will cause the LED 92 to emit more or less light, which in turn will increase or decrease the resistance value of photoresistor 90, thereby, changing the AC gain of amplifier 84 such that the effective value of the AC voltage appearing at the reference point 22' is equal to the DC reference voltage.

The voltage at the reference point 22' is coupled in a second path, the second path being a DC current path including resistor 128, to the input of amplifier 122. The second path further includes amplifier 122, resistor 134, amplifier 138, resistor 96 and AC–DC amplifier 84. The DC voltage appearing at terminal 126 is compared to the DC reference voltage appearing at terminal 124. If these voltages are not substantially equal then the DC voltage at the amplifier output terminal 132 will vary and assume a value such that when fed through unity gain inverting amplifier 138 and amplifier 84 which again inverts the voltage will cause the DC voltage at terminal 126 to substantially equal the DC reference voltage at terminal 124.

If the DC voltage at the comparison point 22' and the effective AC voltage at the comparison point 22' are substantially equal to the DC reference voltage, they are equal to each other. If resistors 96 and 82 are selected to be equal and since amplifier 84 is common to and used in both the AC and DC current paths to obtain the voltages at comparison point 22' then the DC voltage between terminals 18' and 12' and 140 and 12', are equal to the effective or root mean square (R.M.S.) value of the unknown AC voltage wave coupled across terminals 10' and 12'. The voltage appearing across terminals 18' and 12' or 140 and 12' may be read on any accurate conventional indicating device such as a digital voltmeter. For convenience the present embodiment of the invention provides a DC voltage of either polarity, each having equal magnitude and being equal to the true R.M.S. value of the unknown AC voltage wave.

In the preferred embodiment of the invention the AC-DC amplifier 84 is connected in an inverting arrangement, therefore, in order to obtain the proper polarity to close the DC current loop an additional inverting amplifier 138 is required. If amplifier 84 is connected in a non-inverting arrangement then the output terminal 132 of amplifier 122, which is also connected in an inverting arrangement could be connected directly to output terminal 144, thereby eliminating amplifier 138.

It is also to be noted that resistor 96 was stated to be selected equal to resistor 82 in the above explanation. If resistor 96 is selected to be greater in value than resistor 82 and a fixed multiple of resistor 82 then the DC output voltage at terminals 18' and 140 is a fixed multiple of the unknown AC input voltage wave.

It is further to be noted, that since the thermal converters are connected in a series bucking arrangement any changes in ambient temperature will effect both units equally and be cancelled out. Also, since the thermal converter is always operated at the same temperature and current levels they do not have to track each other or have a perfect square law response over an appreciable dynamic range to insure system accuracy. Furthermore, the square law property of the thermal converter provides a linear output scale arrangement for linear input signal voltage changes.

Thus, there has been disclosed a true R.M.S. to DC converter which is completely automatic, provides fast response, operates over a frequency range of 10 to 20 MHZ, has a sensitivity of 1 millivolt full scale, has an accuracy of 0.05% of reading ± 0.05% of full scale and has a resolution of 100 nanovolts.

Having thus described the nature of the invention, what I claim herein is:

1. An apparatus for converting an unknown complex AC voltage wave to its true root mean square value comprising:
   a. a DC reference voltage;
   b. first means for coupling an AC voltage proportional to said unknown complex AC voltage wave to a comparison point;
   c. means for automatically varying said first coupling means to maintain the effective heating value of said AC voltage equal to the effective heating value of said DC reference voltage;
   d. a variable DC output voltage responsive to said unknown complex AC voltage wave; and
   e. second means for coupling a portion of said DC output voltage to said comparison point, said second coupling means providing a DC voltage at said comparison point substantially equal to said DC reference voltage.

2. An apparatus for converting an unknown complex AC voltage wave to its true root mean square value according to claim 1 wherein said first coupling means comprises a capacitor, a fixed resistor and a variable impedance coupled in series.

3. An apparatus for converting an unknown complex AC voltage wave to its true root mean square value according to claim 1 wherein said means for varying said first coupling means comprises:
   a. a variable impedance coupled from said comparison point to a reference terminal, said variable impedance being light responsive;
   b. first and second thermal converters having a pair of input and a pair of output terminals, said input terminals being connected in series and said output terminals being connected in series opposition, said input and output terminals having a common junction point coupled to said reference terminal, one of said input terminals being coupled to said DC reference voltage;
   c. means for amplifying an AC signal coupled between said comparison point and the other of said thermal converter input terminals;
   d. a light emitting device coupled in close proximity to said variable impedance and having one end coupled to said reference terminal; and
   e. a first differential amplifier having two input terminals and an output terminal, one of said input terminals being coupled to each end of said serially opposed thermal converter output terminals, said differential amplifier output terminal being coupled to said light emitting device varying the light output from said light emitting device in a manner to insure that the root mean square value of the AC voltage between said comparison point and said reference terminal is substantially equal to the DC reference voltage.

4. An apparatus according to claim 3 wherein said second coupling means comprises:
   a. a second differential amplifier having two input terminals and an output terminal, said amplifier providing said DC output voltage at said output terminal, one of said input terminals being DC coupled to said reference voltage, the other of said input terminals being DC coupled to said comparison point maintaining said DC voltage between said comparison point and said reference terminal substantially equal to said DC reference voltage, whereby said DC output voltage is substantially equal to the root mean square value of said unknown complex AC voltage wave.

5. An apparatus according to claim 4 wherein said variable impedance is a photoresistor and said light emitting device is a light emitting diode (LED).

6. An apparatus for converting an unknown complex AC voltage wave to its true root mean square value according to claim 1 wherein said first coupling means comprises:
   a. means for amplifying an AC and DC voltage having an input terminal and an output terminal, said output terminal being coupled to said comparison point;
   b. a variable impedance coupled from said output terminal to said input terminal of said AC and DC amplifying means, said variable impedance being light responsive;
   c. a capacitor; and
   d. a fixed resistor connected in series with said capacitor, and coupled to the input terminal of said AC and DC amplifying means.

7. An apparatus for converting an unknown complex AC voltage wave to its true root mean square value according to claim 6 wherein said variable impedance is a photoresistor and said light emitting device is a light emitting diode (LED), and said AC and DC amplifying means is an operational amplifier.

8. An apparatus for converting an unknown complex AC voltage wave to its true root mean square value according to claim 6 wherein said means for varying said first coupling means comprises:
   a. first and second thermal converters having a pair of input terminals and a pair of output terminals, said input terminals being connected in series and said output terminals being connected in series opposition, said input and output terminals having a common junction coupled to said reference terminal, one of said input terminals being coupled to said DC reference voltage, the other of said input terminals being AC coupled to said comparison point;

b. a light emitting device coupled in close proximity to said variable impedance and having one end coupled to said reference terminal; and c. a first differential amplifier having two input terminals and an output terminal, one of said input terminals being coupled to each end of said serially opposed thermal converter output terminals, said differential amplifier output terminal being coupled to said light emitting device varying the light from said light emitting device in a manner insuring the root mean square of the AC voltage between said comparison point and said reference terminal is substantially equal to the DC reference voltage.

9. An apparatus according to claim 8 wherein said second coupling means comprises:

a. a second differential amplifier, having two input terminals and an output terminal, said output terminal providing said variable DC output voltage, one of said input terminals being DC coupled to said reference voltage, the other of said input terminals being coupled to said comparison point; and b. third means for amplifying and inverting a DC voltage having an input terminal and an output terminal, said input terminal being DC coupled to the output terminal of said second differential amplifier, said output terminal being DC coupled to the input terminal of said means for amplifying an AC and DC voltage maintaining said DC voltage between said comparison point and said reference terminal substantially equal to said DC reference voltage, whereby, said DC output voltage is substantially equal to the true root mean square value of said unknown AC voltage.

10. An apparatus according to claim 9 wherein said output terminal of said third means is coupled to said input terminal of said means for amplifying an AC and DC voltage, by a second resistor, said second resistor being substantially equal to said fixed resistor.

11. An apparatus according to claim 9 wherein said output terminal of said third means is coupled to said input terminal of said means for amplifying an AC and DC voltage by a second resistor, said second resistor being proportional to said fixed resistor, whereby said DC output voltage is proportional to the true root mean square value of said unknown complex AC voltage.

12. An apparatus according to claim 8 wherein said second means comprises a second differential amplifier having two input terminals and an output terminal, said output terminal providing said variable DC output voltage and being DC coupled to the input terminal of said means for amplifying an AC and DC voltage, one of said input terminals being DC coupled to said DC reference voltage, the other of said input terminals being coupled to said comparison point maintaining said DC voltage between said comparison point and said reference terminal substantially equal to said DC reference voltage, whereby said DC output voltage is proportional to the true root mean square value of said unknown complex AC voltage wave.

13. An apparatus for obtaining the true root mean square value of a complex AC voltage wave comprising:

a. a first current path, including at least a first capacitor, a first resistor, and a first thermal converter;

b. a second current path, including at least a second resistor and an impedance included in said first current path, said impedance being a common impedance of said first and second current paths, c. a DC reference voltage;

d. a variable DC output voltage;

e. first means for comparing a portion of said complex AC voltage wave to said DC reference voltage and maintaining their effective values equal by controlling the voltage drop across said common impedance; and f. second means for comparing a portion of said DC output voltage to said DC reference voltage and maintaining their effective values equal, thereby maintaining said DC output voltage proportional to the true R.M.S. value of said complex AC voltage wave.

14. An apparatus for obtaining the true R.M.S. value of a complex AC voltage wave according to claim 13 wherein said first current path further includes an AC operational amplifier having input and output terminals, said output terminal being coupled to said first thermal converter, and a second capacitor, said second capacitor coupling said input terminal of said AC operational amplifier to a comparison point.

15. An apparatus for obtaining the true R.M.S. value of a complex AC voltage wave according to claim 14 wherein said first means comprises:

a. a photoresistor coupled from said comparison point to a reference terminal;

b. a light emitting diode coupled in close proximity to said photoresistor, said photoresistor having one end coupled to said reference terminal;

c. first and second terminal converters having a pair of input and a pair of output terminals, said input terminals being connected in series and said output terminals being connected in series opposition, said input and output terminals having a common junction point coupled to said reference terminal, one of said input terminals being coupled to said DC reference voltage;

d. a first differential amplifier having two input terminals and an output terminal, one of said input terminals being coupled to each end of said serially opposed thermal converter output terminals, said differential amplifier output terminal being coupled to said light emitting diode varying the light output from said light emitting diode in a manner to insure the R.M.S. value of the AC voltage between, said comparison point and said reference terminal is substantially equal to the DC reference voltage.

16. An apparatus according to claim 15 wherein said second means further includes:

a. a second differential amplifier having two input terminals and an output terminal, said differential amplifier providing said variable DC output voltage at said output terminal, one of said input terminals being coupled to said DC reference voltage, the other of said input terminals being coupled to said comparison point maintaining said portion of said DC output voltage between said comparison point and said reference terminal substantially equal to said DC reference voltage, whereby said DC output voltage is proportional to the R.M.S. value of said unknown AC voltage.

17. An apparatus for obtaining the true R.M.S. value of a complex AC voltage wave according to claim 13 wherein said first current path further includes:
   a. an AC–DC operational amplifier, having input and output terminals, said input terminal being coupled through said first resistor and said first capacitor connected in series to said complex AC voltage wave, said output terminal being coupled to a comparison point;
   b. a photoresistor coupled from said output terminal to said input terminal of said AC–DC operational amplifier for controlling the gain of said AC–DC amplifier; and
   c. a second capacitor coupled between said output terminal of said AC–DC operational amplifier and an input terminal of said first thermal converter, said AC–DC operational amplifier being a common impedance in said first and second current paths.

18. an apparatus according to claim 17 wherein said first means comprises:
   a. a light emitting diode coupled in close proximity to said photoresistor, said photoresistor having one end coupled to a reference terminal;
   b. first and second thermal converters having a pair of input terminals and a pair of output terminals, said input terminals being connected in series and said output terminals being connected in series opposition, said input and output terminals having a common junction point coupled to said reference terminal, the other of said input terminals being coupled to said DC reference voltage; and
   c. a first differential amplifier having two input terminals and an output terminal, one of said input terminals being coupled to each end of said serially opposed thermal converter output terminals, said differential amplifier output terminal being coupled to said light emitting diode varying the light output from said light emitting diode in a manner to insure the true R.M.S. value of the AC voltage between said comparison point and said reference terminal is proportional to the DC reference voltage.

19. An apparatus according to claim 18 wherein said second means comprises a second differential amplifier having two input terminals and an output terminal, said second differential amplifier providing said variable DC output voltage at said output terminal and being DC coupled to said input terminal of said AC–DC operational amplifier, one of said input terminals being coupled to said DC reference voltage, the other of said input terminals being coupled to said comparison point and said reference terminal substantially equal to said DC reference voltage, whereby said DC output voltage is proportional to the true R.M.S. value of said complex AC voltage wave.

20. An apparatus according to claim 19 wherein said output terminal of said second differential amplifier is coupled to the input terminals of said AC–DC operational amplifier by a second resistor, said second resistor being proportional to said first resistor, whereby said DC output voltage is proportional to the true R.M.S. value of said complex AC voltage wave.

* * * * *

PO-1050
(5/69)

UNITED STATES PATENT OFFICE
CERTIFICATE OF CORRECTION

Patent No. 3,723,845          Dated March 27, 1973

Inventor(s) JAMES J. DUCKWORTH

It is certified that error appears in the above-identified patent and that said Letters Patent are hereby corrected as shown below:

Col. 1, line 28, change "are" to --use--.

Col. 2, line 60, delete the word "ed".

Col. 3, line 34, change "of" to --to--.

Col. 7, line 21, after "10" insert --HZ--.

Signed and sealed this 28th day of August 1973.

(SEAL)
Attest:

EDWARD M. FLETCHER, JR.        RENE D. TEGTMEYER
Attesting Officer              Acting Commissioner of Patents